United States Patent
Shinya

(10) Patent No.: US 7,749,559 B2
(45) Date of Patent: Jul. 6, 2010

(54) METHOD FOR MANUFACTURING A SURFACE-TREATED SILICON SUBSTRATE FOR MAGNETIC RECORDING MEDIUM

(75) Inventor: Naofumi Shinya, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/467,372

(22) Filed: May 18, 2009

(65) Prior Publication Data
US 2009/0223923 A1 Sep. 10, 2009

Related U.S. Application Data

(62) Division of application No. 11/334,017, filed on Jan. 18, 2006, now abandoned.

(30) Foreign Application Priority Data

Jan. 19, 2005 (JP) ............... 2005-011528
Jan. 19, 2005 (JP) ............... 2005-011529

(51) Int. Cl.
*B24C 1/00* (2006.01)
*C23C 16/54* (2006.01)
*G11B 5/64* (2006.01)

(52) U.S. Cl. .................. 427/129; 451/28; 438/692; 428/846.3; 216/53

(58) Field of Classification Search ............. 438/690, 438/691, 693, 692; 264/41; 51/309, 308; 427/127, 129; 428/846.3, 846.1, 848.2, 62.4, 428/410, 409, 848, 846.9; 216/53; 451/28; 365/232; 501/55, 59, 70, 108, 15, 14, 5; 65/29.21, 30.14, 66
See application file for complete search history.

(56) References Cited

U.S. PATENT DOCUMENTS 5,985,404 A 11/1999 Yano et al.

(Continued)

FOREIGN PATENT DOCUMENTS

JP 53057144 A 5/1978

(Continued)

OTHER PUBLICATIONS

Invitation to Respond to Written Opinion corresponding to Singapore Patent Application No. 200600508-6 dated Sep. 15, 2008.

*Primary Examiner*—Kevin M. Bernatz
*Assistant Examiner*—Louis Falasco
(74) *Attorney, Agent, or Firm*—Myers Bigel Sibley & Sajovec, PA

(57) ABSTRACT

Provided is a textured silicon substrate for a magnetic disk, comprising a magnetic film in which magnetic anisotropy can be attained and high recording density can be achieved, while ensuring the flying stability of a head by controlling the surface roughness of the substrate through texturing. Especially, provided is a surface-treated silicon substrate for a magnetic disk, comprising a texture formed on a surface of a silicon substrate comprising an oxide film of 0 to 2 nm thickness, and a magnetic recording medium comprising the surface-treated silicon substrate. Also provided is a method for manufacturing a surface-treated silicon substrate for a magnetic disk, comprising steps of: removing or reducing an oxide film on a surface of a silicon substrate; and forming a texture on the surface of the silicon substrate having the oxide film removed or reduced using a free abrasive-containing slurry and a tape; and a magnetic recording medium comprising the silicon substrate.

9 Claims, 6 Drawing Sheets

U.S. PATENT DOCUMENTS

| | | |
|---|---|---|
| 6,057,021 A | 5/2000 | Ishikawa et al. |
| 6,194,045 B1 | 2/2001 | Annacone et al. |
| 6,299,659 B1 * | 10/2001 | Kido et al. ............... 51/309 |
| 6,372,367 B1 | 4/2002 | Matsuda et al. |
| 6,537,648 B1 | 3/2003 | Takahashi et al. |
| 6,731,446 B2 | 5/2004 | Ikeda et al. |
| 6,782,717 B2 | 8/2004 | Saito et al. |
| 2002/0055017 A1 | 5/2002 | Fukushima et al. |
| 2002/0123224 A1 * | 9/2002 | Lee et al. ............... 438/689 |
| 2002/0160610 A1 * | 10/2002 | Arai et al. ............... 438/692 |
| 2003/0094721 A1 * | 5/2003 | Horie et al. ............... 264/41 |
| 2003/0108772 A1 | 6/2003 | Noguchi et al. |
| 2004/0033693 A1 * | 2/2004 | Park et al. ............... 438/691 |
| 2004/0132305 A1 * | 7/2004 | Nishimoto et al. ......... 438/690 |
| 2005/0250296 A1 | 11/2005 | Yamamura et al. |

FOREIGN PATENT DOCUMENTS

| | | |
|---|---|---|
| JP | 7263406 | 10/1995 |

* cited by examiner

METHOD FOR MANUFACTURING A SURFACE-TREATED SILICON SUBSTRATE FOR MAGNETIC RECORDING MEDIUM

RELATED APPLICATIONS

This application is a divisional of U.S. patent application Ser. No. 11/334,017, filed Jan. 18, 2006 now abandoned, which claims priority from Japanese Patent Application No. 2005-011528; filed Jan. 19, 2005, and Japanese Patent Application No. 2005-011529; filed Jan. 19, 2005, the disclosures of which are incorporated herein by reference in their entireties.

BACKGROUND OF THE INVENTION

1. Field of the Invention

The present invention relates to a substrate for a magnetic recording medium and the method for manufacturing the magnetic recording medium.

2. Description of the Related Art

The recording density (surface density) of magnetic recording has been increased very rapidly, and, in this decade, it has experienced a continuous rapid increase at an annual rate of 50 to 200%. In mass-production level, products having the surface recording density of 70 Gbits/inch$^2$ are commercially available, while in laboratory level, the double surface recording density of 160 Gbits/inch$^2$ has been reported. The mass-production level surface recording density is equivalent to 80 G-bytes per platter for a 3.5" HDD, and is equivalent to 40 G-bytes per platter for a 2.5" HDD. In applications of a usual desktop personal computer (a 3.5" HDD is mounted) and a notebook personal computer (a 2.5" HDD is mounted), this recording capacity is enough for the applications of mounting a recording medium of only one platter.

The recording density is expected to improve in future. However, a conventional longitudinal magnetic recording mode is reaching a recording limit due to thermal fluctuation. It is considered that when its recording density reaches 100 to 200 Gbits/inch$^2$, a vertical magnetic recording mode will sequentially take over. Although the recording limit of the vertical recording is not known precisely now, it is considered that a value of 1000 Gbits/inch$^2$ (1 Tbits/inch$^2$) may be attained. If such high recording density could be attained, a recording capacity of 600 to 700 Gbytes per platter for a 2.5" HDD would be attained.

In this regard, in order to realize high density recording, it is required to reduce the flying height of a magnetic recording head from the conventional height of 30 nm to 10 nm or less. Thus, it becomes necessary to smooth the substrate surface. However, it has been found that, if the surface roughness at a micro level (Roughness) is too small, a problem of attachment of the head to the substrate or a problem of decrease of flying stability of the head takes place. Thus, it is ideal to provide a substrate having as small Waviness and Micro-Waviness as possible, as well as Roughness on the order of 0.3 to 2.0 nm. As the terms concerning the roughness of a substrate to be used for a magnetic recording medium having a magnetic film, "Waviness", "Micro-Waviness" and "Roughness" are used for representing the roughness of observing ranges of 5 to 100 mm, 80 μm to 5 mm, and 80 μm or less, respectively.

In addition, in magnetic recording, if the recording density per unit area is enhanced, the volume of the magnetic recording unit (bit) has to be decreased as a matter of course. However, it is known that, as the volume of a magnetic body originating a ferromagnetic material in charge of recording is decreased, the ferromagnetic material does not continue to be held stable forever, due to a fundamental principle of the magnetism theory. It is known that, as the competition at room temperature between thermal energy kT (k: Boltzmann constant, T: absolute temperature) and anisotropic energy $K_uV$ ($K_u$: anisotropic energy, especially crystal anisotropic energy in case of magnetic recording; V: the volume of unit recording bit) makes the volume of the magnetic recording unit extremely small, or close to the range of kT to $K_uV$, so that the magnetized state of the ferroelectric body becomes unstable. When the unit of magnetization is extremely small like this, the ferromagnetic body behaves as if it is a paramagnetic body. Such a state is called super paramagnetism. It is known that each material has a specific limit size (critical volume) at which super paramagnetism state appears. In an actual magnetic recording, as the volume of recording unit is decreased down to near the critical volume by increasing recording density, the magnetization in a ferromagnetic state decays rapidly as time passes before reaching a super paramagnetic state. Consequently, the magnetization orienting in random directions generates a problem of degenerating magnetic recording information. The occurrence of such a phenomenon in magnetic recording poses extremely serious problems in that recording information written with effort cannot be read out after a certain time passes, or in that writing itself cannot be performed after a certain time passes.

Methods of roughening the surface of a silicon substrate include a dry etching process using chlorine (Japanese Patent Application Unexamined Publication No. 7-263406/1995), and a treatment using alkali hydroxide (Japanese Patent Application Unexamined Publication No. 53-57144/1978), depending on the chemical properties. In these methods, although the surface roughness may be controlled, it is not possible to finish the entire surface of the substrate in a uniform surface roughness (Roughness). Specifically, since the substrate is kept stationary and etched under an uneven circumstance during etching, selective etching occurs so that a flaw appears due to a processing stress remaining in the substrate. As described above, a uniform surface roughness (Roughness) cannot be practically attained by simply using acid or alkali etching. Magnetic anisotropy cannot be obtained in the magnetic recording film by using this treatment alone.

SUMMARY OF THE INVENTION

The present inventors have experienced that, in a hard disk medium, a substrate having a suitably textured surface generates magnetic anisotropy in the substrate surface direction of a recording film formed on the substrate so that the value of $K_u$ increases. The inventors thought that in order to attain a hard disk medium with high recording density, it is necessary to subject the substrate to a suitable texturing processing. The inventors also thought that, in a hard disk substrate, it is necessary to provide the substrate with a texture of a concentric circle shape in the circumferential direction of the substrate in order to provide magnetic anisotropy, while maintaining suitable roughness for head flying stability.

Therefore, the present invention provides a textured silicon substrate for a magnetic disk having a magnetic film, and its manufacturing method. According to the present invention, the degree of the surface roughness (Roughness) of the substrate can be controlled by texturing, head flying stability is assured, magnetic anisotropy can be attained in the magnetic recording film, and high recording density can be attained.

According to the present invention, to address the above problems, the various approaches are attempted and it is found that preferably, after removing or reducing an oxide film on a surface of a silicon substrate for magnetic recording medium, texture is formed in circumferential and radial directions of the substrate by texturing, uniform surface roughness (Roughness) of the substrate and good magnetic anisotropy in a magnetic recording film can be attained. Specific conditions are further studied to complete the present invention.

Specifically, the present invention provides a surface-treated silicon substrate for a magnetic disk comprising a texture formed on a surface of a silicon substrate having an oxide film of 0 to 2 nm thickness, and a magnetic recording medium comprising the silicon substrate.

Moreover, the present invention provides a method for manufacturing a surface-treated silicon substrate for a magnetic disk comprising steps of: removing or reducing an oxide film on a surface of a silicon substrate, and forming a texture on a surface of the silicon substrate having the oxide film removed or reduced by performing mechanical texture processing using a free abrasive-containing slurry and a tape; and a magnetic recording medium comprising the surface-treated silicon substrate manufactured in the method.

According to the present invention, it is possible to lower the flying height of a magnetic recording head than that of prior art, further good magnetic anisotropy can be attained in a magnetic recording film, and higher recording density can be achieved.

BRIEF DESCRIPTION OF THE INVENTION

FIG. 1 exhibits an example of texturing;

FIG. 2 exhibits a texture on a surface of a silicon substrate;

DETAILED DESCRIPTION OF THE PREFERRED EMBODIMENT(S)

Figure 1:
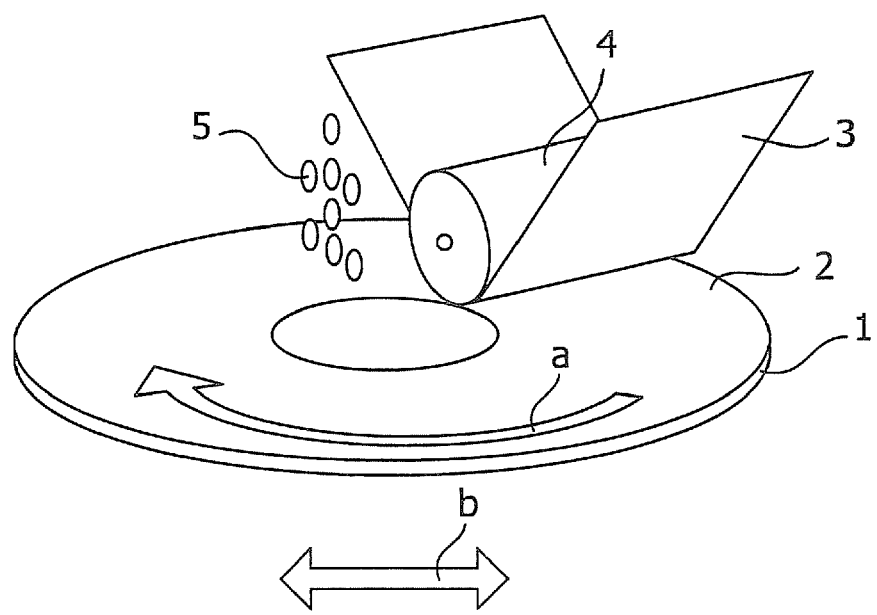

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

According to the present invention, specifically a silicon substrate for a magnetic recording medium is provided, an oxide film on a silicon substrate for a magnetic recording medium is removed or reduced prior to texturing, and a texture is formed in circumferential directions and radial directions on a surface of the silicon substrate by texturing. Consequently, uniform surface roughness (Roughness) of the substrate and magnetic anisotropy good for a magnetic recording film can be obtained.

When the surface oxide film is thick, texturing is not done uniformly so that uniform magnetic anisotropy and good head flying stability cannot be attained in the magnetic recording film. The reason can be explained as follows. The oxide film on the surface of silicon is silicon dioxide. In other words, so-called quartz glass exists on the substrate surface. Although silicon and quartz glass have Mohs hardness of 7, quartz glass is actually a little softer than silicon. It is considered that texturing is not applied uniformly because of the difference in hardness. It is preferable that the surface oxide film is removed or reduced to a thickness of 0 to 2 nm.

Immediately after cutting or polishing silicon, its surface oxidation gradually progresses to form an oxide film on the surface. Although the progress of the oxidation depends on the amount of dopant such as boron or phosphor, the oxide film is formed by leaving in the atmosphere or chemical cleaning such as RCA cleaning. The film thickness may range on the order of 1 to 10 nm. Although the oxide film is not so thick, when a surface is subjected to texturing to reach a nanometer level as in case of a texture, the oxide film cannot be ignored.

A method for removing the oxide film may include polishing and chemical treatment. According to the present invention, it is found that the problems can be solved by texturing the surface immediately after the scrub-cleaning following the surface treatment.

A chemical treatment, which is one of the methods for removing the oxide film, may include a method for removing the oxide film using a chemical liquid. An example of the chemical liquid which is effective to removal of silicon dioxide may include a fluorine-containing compound such as a fluorine group-containing acid or a salt thereof. It is found that the problems can be solved by immersing the silicon substrate in a chemical liquid having ability to dissolve silicon dioxide for approximately 1 to 60 seconds so as to remove the oxide film, and then texturing the silicon substrate. The chemical liquid having ability to dissolve silicon dioxide may include hydrogen fluoride and ammonium fluoride.

In the case of polishing, it may be basically double sided polishing by a double sided polishing machine. The polishing machine may contain polishing cloth on both sides and an abrasive can be used for wet polishing.

A silicon substrate to be used in the present invention may include single crystal silicon and poly crystal silicon where there is no specific limitation concerning P-type, N-type, or a manufacturing method. Since the substrate is not dependent on electrical properties of silicon itself, the substrate can be produced from recycled wafer which is ready for scrape. Accordingly, the cost of its raw material can be suppressed.

As for the method of texturing, the texturing may be done to both sides of the substrate fixed to a bore spindle, applying tapes and free abrasives on the both sides. The texturing in circumferential directions is done by spindle rotation and the texturing in radial directions is done by spindle reciprocation. The texturing in radial directions may not be a line being parallel to the radial directions, but be a line on a slant because of the structure of the texturing machine.

Although the texture may be formed basically in circumferential directions, it also can be formed in radial directions due to the reciprocation and a reciprocation frequency. However, the texturing in radial directions may not be a line being parallel to the radial directions, but be a line on a slant because of the structure of the texturing machine. The angle may be determined by the rotational number of the substrate and the reciprocation frequency. According to the present invention, texturing may be referred to as making cut in circumferential directions as well as in radial directions.

Figure 2:
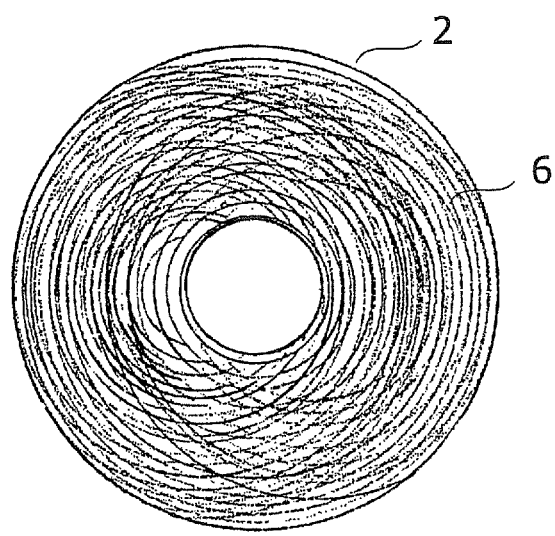

A specific example of texturing is shown in FIG. 1. While rotating a silicon substrate 1 in the manner of a, slurry 5 of various kinds of abrasives is dropped on the substrate. While pressing a tape 3 against both surfaces of the substrate using a roller 4, texturing is performed on the surface 2 of the silicon substrate. Lines in circumferential directions are crossed by reciprocating the substrate in the manner of b, while lines can also be made in radial directions. The lines (cut) in circumferential directions are for providing magnetic anisotropy, and the lines in radial directions are considered to be effective for preventing a head from attaching. The obtained texture on the surface of the silicon substrate is shown in FIG. 2.

The abrasive to be used for texturing may be a particle having higher hardness than silicon. The abrasive may be preferably a particle selected from a group consisting of diamond, alumina, titanium oxide, silicon carbide and titanium carbide. The abrasive may preferably have an average particle size of 300 nm or less. Since the hardness (Mohs hardness) of silicon is seven, any material having hardness of seven or higher and having an average particle size of 300 nm or less, may be used without special limit.

The tape to be used for texturing can be generally classified into unwoven fabric (for example, material used for the separator of a cell), and woven fabric. As for the woven fabric, hair implantation type (for example, material such as the cover of a piano) can be used.

Although depending on the size of the substrate, texturing may be preferably performed by reciprocating the tape, while dropping the slurry between the tape and the substrate. Preferable conditions may include a spindle speed of 100 to 1000 rpm, a roll pressure of 100 g to 10 kg, a texturing time of 5 to 60 seconds and a reciprocation frequency of 1 to 50 Hz.

After the texturing step, scrub-cleaning or RCA cleaning, and subsequent drying may be carried out. Consequently, a substrate for a magnetic recording medium having uniform Roughness in which magnetic anisotropy can be achieved in the magnetic recording film, is obtained.

The scrub-cleaning may be performed preferably using relatively soft material such as brush or sponge (for example, PVA and urethane). The RCA cleaning is a cleaning in use of an aqueous solution containing hydrogen peroxide and ammonia, and the cleaning can be performed by optional application of heating and/or ultrasonic wave or the like.

The drying may be performed preferably using warm air, cool air, or spin type drying.

The surface-treated substrate for a magnetic recording medium of the present invention can be made as flat as possible except Roughness and have, in a radial direction on the surface for recording information, preferably 10 to 1000 lines/μm, more preferably 20 to 300 lines/μm; preferably 10 to 1000 protrusions/μm$^2$, more preferably 40 to 500 protrusions/μm$^2$; and average surface roughness (Roughness) (Ra) of preferably 0.3 to 2.0 nm. Consequently, the substrate is prevented from attaching to the magnetic recording head, even if the height of the magnetic recording head with respect to the substrate surface is 10 nm or less. Thus, the substrate can have a stable head flying property. The substrate can also have good magnetic anisotropy in the magnetic recording film. The maximum height (Ry) of the protrusions may be preferably 10 nm or less.

When the number of lines in radial directions is outside the range of 10 to 1000 lines/μm$^2$, good magnetic anisotropy may not be obtained in a magnetic recording film.

When the number of protrusions on the surface for recording information is outside the range of 10 to 1000 protrusions/1 μm$^2$, the head flying property may become unstable.

Figure 3:
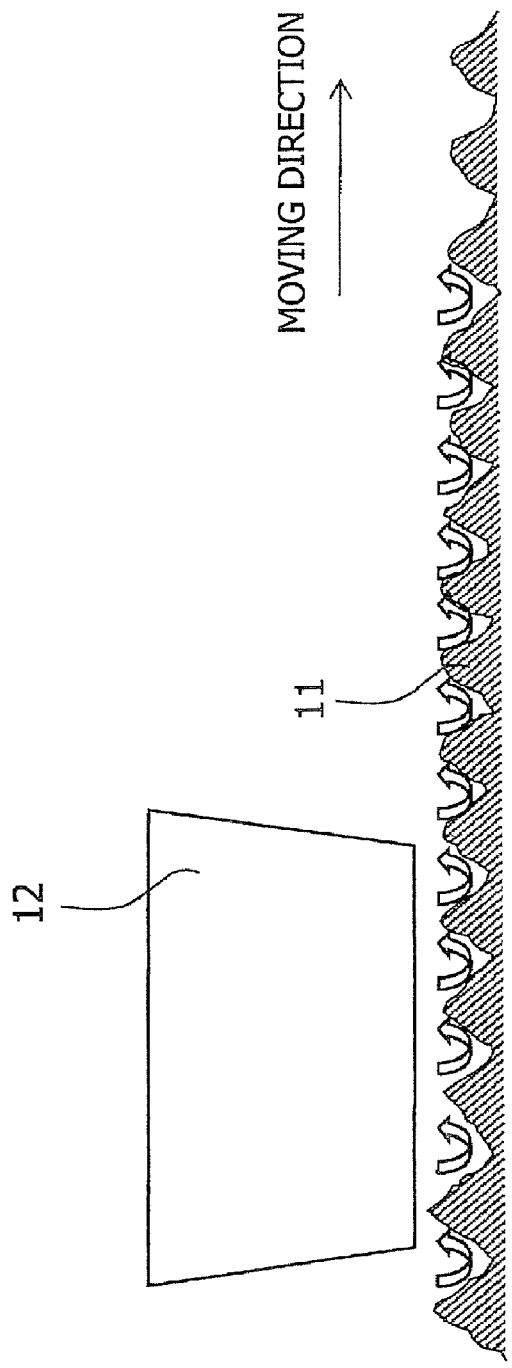
FIG. 3(A) is a conceptual view showing the relationship between a magnetic recording medium comprising a surface-treated silicon substrate of the present invention and a head.
FIG. 3(B) is a conceptual view showing the relationship between a magnetic recording medium comprising a conventional silicon substrate and a head.
Figure 3:
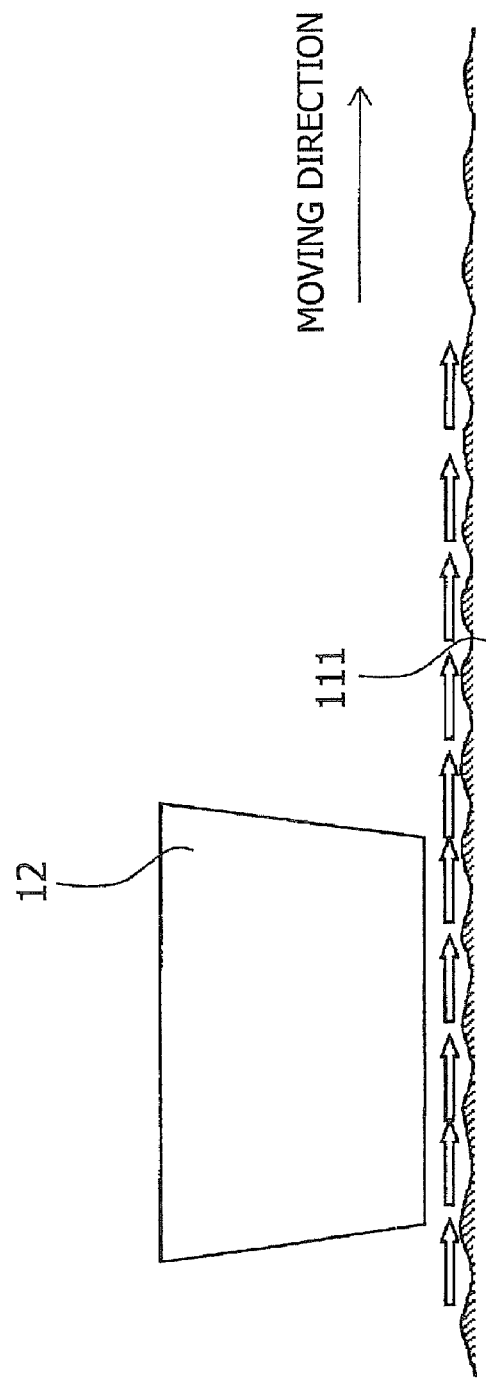

FIG. 3(A) illustrates the relationship between a magnetic recording medium 11 and a head 12 wherein the magnetic recording medium 11 comprises the surface-treated silicon substrate of the present invention. FIG. 3(B) illustrates the relationship between a magnetic recording medium 111 and a head 12 wherein a magnetic recording medium 111 comprising the silicon substrate of the prior art. In FIG. 3(A), a flying force is generated by the rotation of the substrate so that the flying property of the head is increased and no attachment of the head to the substrate occurs. On the other hand, in FIG. 3(B), a flying force is not generated by the rotation of the substrate so that the head flying property becomes unstable and attachment of the head to the substrate occurs. Thus, it is considered that as shown in FIG. 3(A), the flying property of the head becomes stable because of the phenomenon in which the head is floated by an air layer generated by the rotation of the substrate due to the presence of appropriate roughness.

When the maximum height is higher than 10 nm, if the flying height of the head is made lower in order to increase the recording density, the head and the substrate will contact each other. Further, since the flying height of the head becomes 10 nm or less, it is preferable to make the maximum height of the roughness of the substrate surface be 10 nm or less.

When the average surface roughness is less than 0.3 nm, the head flight stability may decrease and attachment of the head to the substrate may occur. When the average surface roughness is more than 2.0 nm, the substrate surface for high recording density may not be obtained.

It may be especially preferable that the average roughness in the circumferential direction is 0.1 to 2 nm, the average roughness in the radial direction is 0.3 to 2.0 nm. It is considered that in accordance with some head properties, the roughness of 0.2 nm or more may be more preferable in view of preventing the head from attaching.

The whole average roughness may be preferably in the range of 0.3 to 2.0 nm.

The average roughness in the circumferential direction may be further preferably 0.3 to 1.0 nm, while the average roughness in the radial direction may be further preferably 0.3 to 1.5 nm.

The numbers of lines and protrusions in the radial direction can be measured with an atomic force microscope (AFM).

The average surface roughness and the maximum height can be measured with an atomic force microscope through the observation area of 3 μm×3 μm.

The roughness in the circumferential and radial directions can be measured by line analysis, respectively.

The average roughness in the circumferential direction can be obtained by the measurement in the range of 3 μm×3 μm toward the circumferential direction at a point inner from the outer circumference of the substrate by 1 mm or more (if applicable, at a point inner from the inner circumference toward the center of the substrate by 1 mm or more). The average roughness in the radial direction can be obtained by the measurement in range of 3 μm×3 μm toward the radial direction at a point inner from the outer circumference of the substrate by 1 mm or more (if applicable, at a point inner from the inner circumference toward the center of the substrate by 1 mm or more).

A magnetic recording medium can be produced by laminating a magnetic layer and a protection layer on the surface-treated silicon substrate through spattering, electroplating or the like.

The present invention will be described below based on examples. However, it should not be construed that the present invention is limited to these examples.

First, the respective measuring methods of the silicon substrate are described below.

<Measurement of Oxide Film Thickness>

The thickness of the oxide film on a surface of a silicon substrate was obtained by measurement in a depth direction with XPS (X-ray photoelectron spectroscopy) (Shimadzu-Kratos, model number: AXIS-HS).

<Head Flying Test>

An underlying layer of Cr having thickness of 100 nm, a magnetic recording layer of Co—Cr—Ta having thickness of 60 nm and a protection layer having thickness of 30 nm were sequentially formed using RF sputtering on the surface-treated silicon substrate of Examples 1 to 8, and the untreated substrate of Comparative Example 1 and the surface-treated substrate of Comparative Example 2 at a substrate temperature of 250° C. in Ar gas atmosphere. Attachment of the head to the substrate was tested by applying a lubricant to the magnetic recording medium, setting flying height to 6 nm, observing the stability of head flying, performing contact start-stop (CSS) and checking whether there is attachment.

<Measurement of Surface Roughness and Maximum Height and Measurement of Protrusions>

Surface roughness was measured with an atomic force microscope (AMF) (Digital Instrument, scanning probe microscope D3100). The observation area was 3 μm square. The numbers of protrusions and lines were visually measured with AFM.

<Determination of Presence or Non-Presence of Magnetic Anisotropy>

VSM magnetization measurement in this specification is referred to as the method for measuring magnetization comprising steps of cutting a sample into a piece of 5 mm square, applying it an alternating external magnetic field of 25 kOe in the substrate surface direction (the direction to which the magnetic field is applied in the parallel to the substrate surface), and obtaining an amount of magnetization and a magnetization curve with a magnetometer of a sample-vibration type.

In addition, magnetic anisotropy in this specification is referred to as the ratio between $H_{CD}$ (circumferential direction) measured by applying an external magnetic field in an inner circumferential direction on the surface of a substrate and $H_{CD}$ (radial direction) measured by applying an external magnetic field in a radial direction on the surface of the substrate, $H_{CD}$ (circumferential direction)/$H_{CD}$ (radial direction). The $H_{CD}$ is defined as the saturated external magnetic field when the value $M_{D2}$ of secondary differentiation of a transition curve with respect to the external magnetic field reaches a maximum. The transition curve is in first quadrant from an external magnetic field of 0 Oe to the maximum magnetic field of 25 kOe among magnetization and transition curves by VSM measurement.

The presence or absence of magnetic anisotropy was determined by performing VSM measurement of the sample in circumferential and radial directions to obtain each saturated external magnetic field $H_{CD}$.

Examples 1 to 4 and Comparative Examples 1 to 2

A 2.5 inch silicon substrate (thickness: 0.65 mm) having Roughness of 0.15 mm or less on basis of AMF observation was provided. A silicon substrates having different thickness of oxide film was obtained by immersing the surface of the silicon substrate in a hydrogen peroxide solution. The thickness of the oxide film was measured with XPS and texturing was performed in the same manner as in FIG. 1 under following conditions.

Rotational number of spindle: 300 rpm
Roller pressure: 20N
Tape material: unwoven fabric (made of nylon)
Roller hardness: 50 duro
Abrasive: diamond slurry
Average particle size of abrasive: 100 nm
Texturing time: 20 seconds After being textured, the substrate was subjected to scrub-cleaning and drying to produce a textured substrate. The surface roughness was measured with AFM. The conditions and results of texturing are shown in Table 1.

An underlying layer of Cr having thickness of 100 nm, a magnetic recording layer of Co—Cr—Ta having thickness of 60 nm and a protection layer of 30 nm were formed by RF sputtering in sequence on the textured silicon substrate at a substrate temperature of 250° C. in Ar gas atmosphere. Subsequently, the substrate was cut into a 5 mm square piece, MH (magnetic hysteresis) loops in circumferential and radial directions were obtained with VSM, and the presence or absence of magnetic anisotropy was checked.

Figure 4:
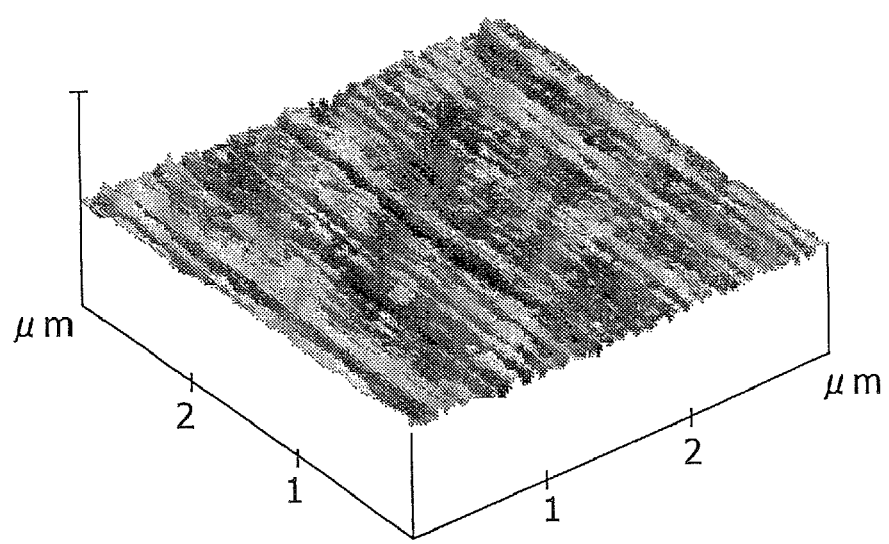
FIG. 4 is an AFM (atomic force microscopy) image of a surface-treated silicon substrate of Example 1.
Figure 5:
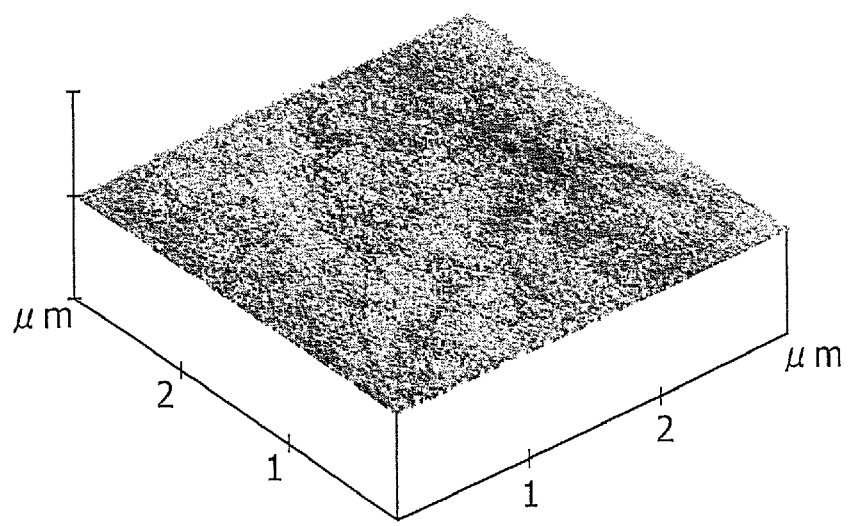
FIG. 5 is an AFM image of a silicon substrate of Comparative Example 1.

In the result, it was confirmed that a silicon substrate of Comparative example 1 prior to texturing had no magnetic anisotropy at all, while the silicon substrate of Example 1 after texturing had clear squareness properties in circumferential and radial directions and had magnetic anisotropy in the circumferential direction. According to FIGS. 4 and 5 exhibiting AFM pictures of Example 1 and Comparative example 1, it is evident that a texture was formed.

Further, the head flying property was measured. The textured silicon substrates of Examples 1 to 4 had high head flying stability and had no attachment of the head in CSS test. Especially, the textured substrate of Example 1 had good results including good stability. On the contrary, the substrate of Comparative Example 1 had poor head flying stability and had attachment of the head in CSS test. Although the textured substrate of Comparative Example 2 had magnetic anisotropy, the texture was not uniform and attachment of the head occurred.

Figure 6:
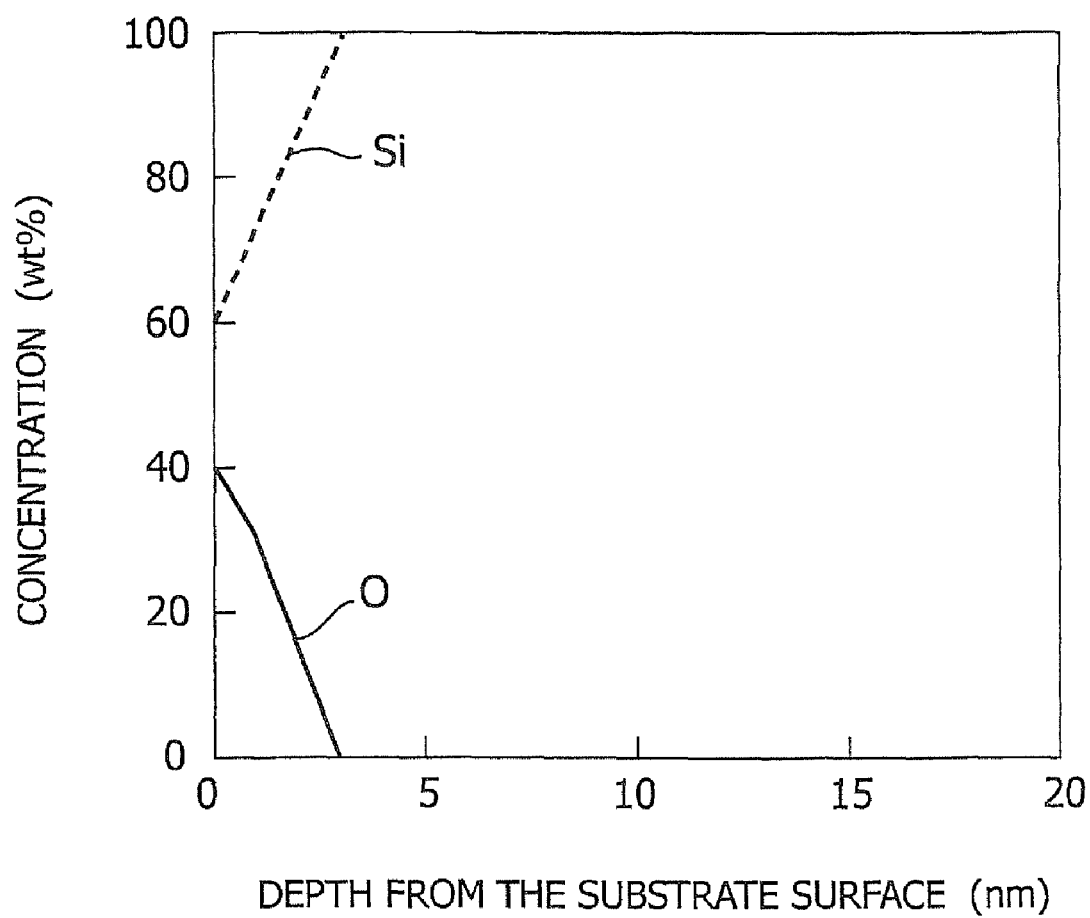
FIG. 6 is a graph showing the result of XPS (X-ray photoelectron spectroscopy) measurement of the surface of the substrate of Comparative Example 2.

The result of surface analysis of the textured substrate of Comparative Example 2 with XPS is shown in FIG. 6. Because the presence of oxide film of 2.5 nm was confirmed, it was likely that texturing had not been performed well under the influence of the oxide film.

Examples 5 to 8

Texturing in the radial direction was examined by providing the same silicon substrate as used in Example 1 and reciprocating the silicon substrate during texturing in the presence of diamond slurry. The reciprocation frequency was 10 Hz and the other texturing conditions were same as in Examples 1 to 3. The texturing conditions and results are shown in Table 1.

As a result, it was confirmed that the textured substrates of Examples 5 to 8 had the roughness in circumferential direction controlled well and had the further improved head flying stability.

However, as the thickness of the oxide film became closer to 2 nm, the tendency was found that texturing became difficult. Accordingly, combination of a silicon substrate having an oxide film of 2 nm or less with optional reciprocation during texturing can produce roughness most suitable for head flying in the circumferential direction.

Average particle size of abrasive: 100 nm
Texturing time: 20 seconds

The texturing was performed on the surface 2 of the silicon substrate by dropping slurry 5 of various kinds of abrasive on the substrate and pressing a tape 3 against both surfaces of the substrate using a roller 4, while rotating a silicon substrate 1.

The substrate after texturing was subjected to scrub-cleaning and drying to produce textured substrate. The surface roughness of the substrate was measured with AFM. The texturing conditions and results are shown in Table 2.

A 100 nm underlying layer of Cr, a 60 nm magnetic recording layer of Co—Cr—Ta and a 30 nm protection layer were formed in sequence on the textured silicon substrate at a

TABLE 1

| | | | Roughness (nm) | | | | | |
|---|---|---|---|---|---|---|---|---|
| | thickness | texturing conditions | line | line | | lines in | | attachment |
| | of oxide on surface (nm) | slurry | spindle reciprocation (Hz) | analysis in circumfential direction | analysis in radial direction | total line analysis | radial direction (lines/μm) | magnetic anisotropy | of head in CSS test |
| Example 1 | 0.5 | diamond | 0 | 0.63 | 0.74 | 0.82 | 18 | present | none |
| Example 2 | 1.0 | diamond | 0 | 0.55 | 0.65 | 0.72 | 17 | present | none |
| Example 3 | 1.5 | diamond | 0 | 0.54 | 0.62 | 0.68 | 16 | present | none |
| Example 4 | 2.0 | diamond | 0 | 0.28 | 0.33 | 0.40 | 14 | present | none |
| Example 5 | 0.5 | diamond | 10 | 0.52 | 0.65 | 0.72 | 18 | present | none |
| Example 6 | 1.0 | diamond | 10 | 0.45 | 0.55 | 0.60 | 18 | present | none |
| Example 7 | 1.5 | diamond | 10 | 0.40 | 0.45 | 0.48 | 16 | present | none |
| Example 8 | 2.0 | diamond | 10 | 0.30 | 0.35 | 0.40 | 15 | present | none |
| Comp. Ex. 1 | 2.5 | — | — | 0.11 | 0.10 | 0.13 | none | none | present |
| Comp. Ex. 2 | 2.5 | diamond | 0 | 0.20 | 0.33 | 0.35 | 9 | present | present |

Examples 9 to 10 and Comparative Examples 3 to 4

A 2.5 inch silicon substrate having thickness of 0.65 mm was polished under the condition such that its Roughness determined with AFM becomes 0.15 nm or less and scrub-cleaned. Subsequently, the texturing was performed in the following condition to produce the textured substrate of Example 9.

A substrate polished in the same manner as in Example 9 was cleaned through usual chemical cleaning (hydrogen peroxide and ammonia were used), immersed in 1 wt % hydrogen fluoride solution for 1 minute, and cleaned with pure water. Subsequently, the texturing was performed in the following condition to produce the textured substrate of Example 10.

A substrate polished in the same manner as in Example 9 was cleaned through usual chemical cleaning (hydrogen peroxide and ammonia were used) and was evaluated without texturing as the substrate of Comparative Example 3.

A substrate polished in the same manner as in Example 9 was cleaned through usual chemical cleaning (hydrogen peroxide and ammonia were used) and was subjected to texturing in the following condition to produce the textured substrate of Comparative Example 4.

Thicknesses of oxide films of respective substrates prior to texturing were measured with XPS. In Comparative Examples 3 and 4, the substrates in the state after the usual chemical cleaning had oxide film having thicknesses of 2.5 nm.

Rotational number of spindle: 300 rpm
Roller pressure: 20N
Tape material: non-woven fabric (made of nylon)
Roller hardness: 50 duro
Abrasive: diamond slurry substrate temperature of 250° C. in Ar gas atmosphere. Next, the substrate was cut into a 5 mm square piece, MH loops were obtained in circumferential and radial directions with VSM and the presence or absence of magnetic anisotropy was checked.

Figure 7:
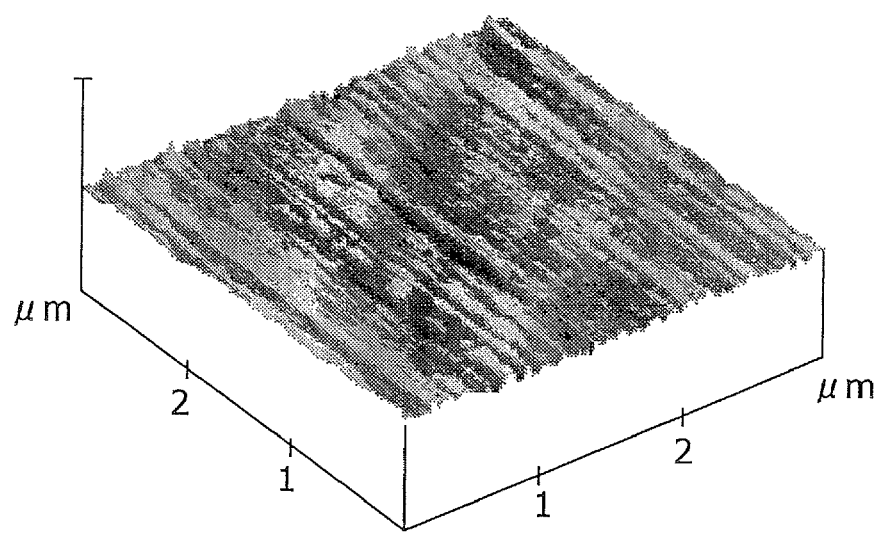
FIG. 7 is an AFM (atomic force microscopy) image of a surface-treated silicon substrate of Example 9.
Figure 8:
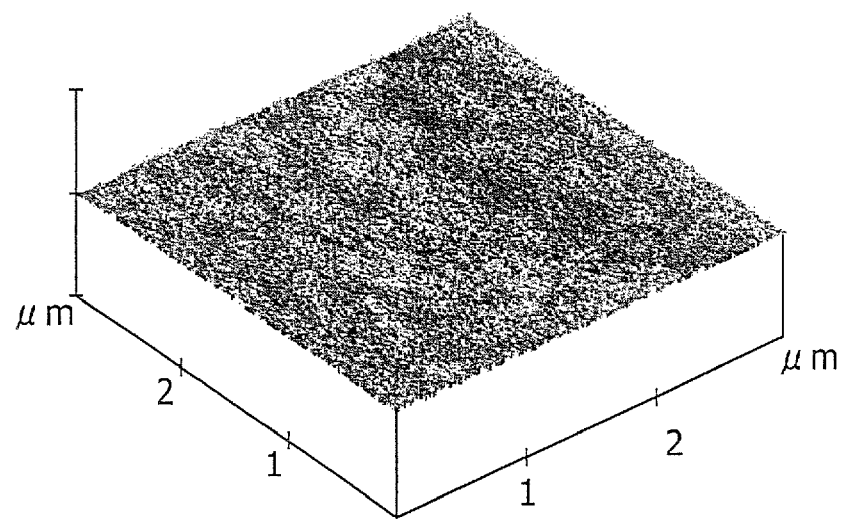
FIG. 8 is an AFM image of a silicon substrate of Comparative Example 3.

As a result, it was confirmed that a silicon substrate of Comparative Example 3 prior to texturing had no magnetic anisotropy at all, while the silicon substrate of Example 9 after texturing had clear squareness properties in circumferential and radial directions and had magnetic anisotropy in the circumferential direction. According to FIGS. 7 and 8, exhibiting AFM images of substrates of Example 9 and Comparative example 3, it is evident that a texture was formed.

Further, the textured silicon substrates of Examples 9 and 10 had high head flying stability and had no attachment of the head in the CSS test. Especially, the textured substrate of Example 10 had good results including good stability. On the contrary, the substrate of Comparative example 1 had poor head flying stability and had attachment of the head in the CSS test. Although the substrate of Comparative Example 4 had magnetic anisotropy, the texture was not uniform and attachment of the head occurred.

Figure 9:
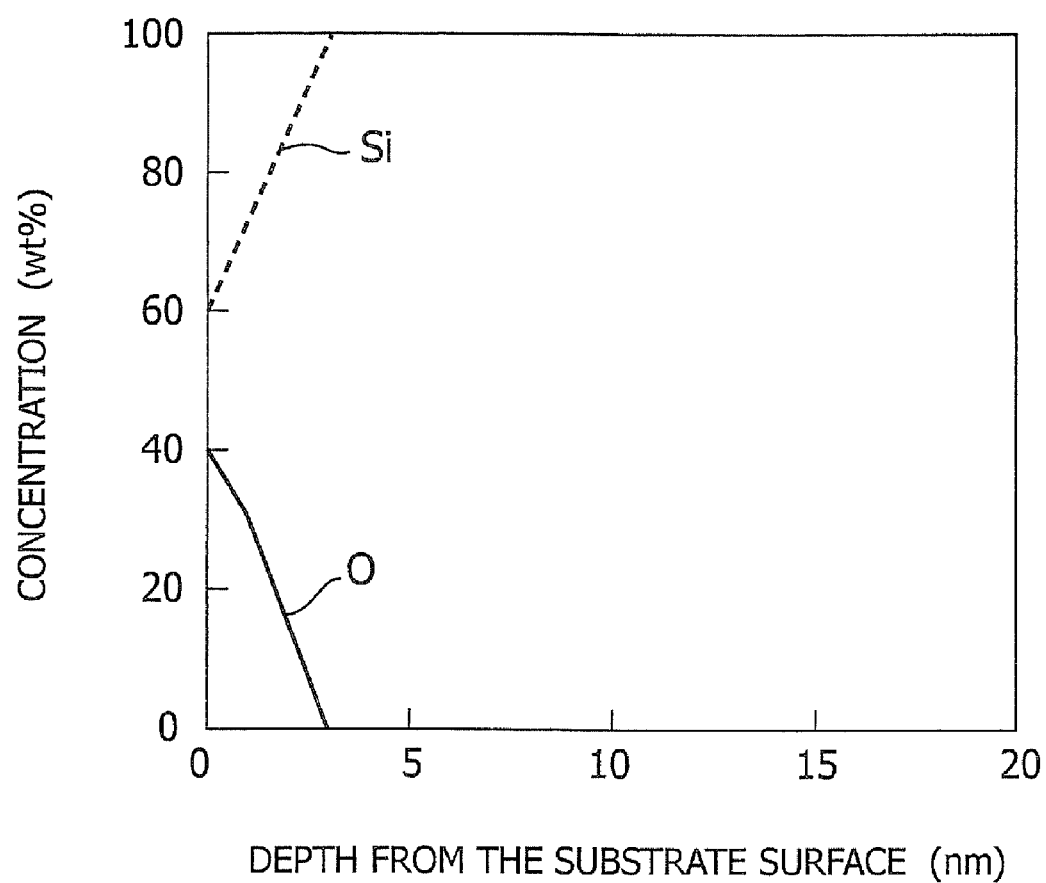
FIG. 9 is a graph showing the result of XPS (X-ray photoelectron spectroscopy) measurement of the surface of the substrate of Comparative Example 4.

The result of surface analysis of the textured substrate of Comparative Example 4 with XPS is shown in FIG. 9. Because the presence of oxide film having thickness of 2.5 nm was confirmed, it is likely that texturing was not performed well due to the influence of the oxide film.

Examples 11 to 14

A substrate polished and cleaned through usual chemical cleaning (hydrogen peroxide and ammonia were used) in the same manner as in Example 10 was subjected to the reciprocation of the substrate during texturing in order to study the texturing in the radial direction. The reciprocation frequency was 0 to 20 Hz and the other texturing conditions were same as in Examples 9 to 10. The texturing conditions and results are shown in Table 2. It was confirmed that the roughness in the circumferential direction can be controlled well by means of the reciprocation frequency and the head flying stability can be further improved. Accordingly, optional addition of the reciprocation during texturing can provide roughness most suitable for head flying in the circumferential direction.

Examples 15 to 17

A 2.5 inch silicon substrate having a 3.0 nm oxide film was provided. A double side polishing was performed to the substrate using colloidal silica as polishing liquid with a polishing machine containing suede-based polishing pads on both surfaces. The polishing was carried out for 5, 10 or 20 minutes at a polishing pressure of 50 g/cm$^2$ with respect to each substrate surface, wherein the polishing pressure is the platen pressure applied on the substrate surface by the double side polishing machine during polish. Then, scrub-cleaning was carried out. The textured substrates of Examples 15 to 17 were obtained after texturing. The texturing conditions and the results are shown in Table 2. The thicknesses of the oxide films in various silicon substrates prior to texturing were 1.5 nm for the substrate polished for 5 minutes, and 0.5 nm for the substrates polished for 10 minutes and 20 minutes.

1000 lines per 1 μm in a radial direction, 10 to 1000 protrusions per μm$^2$, and the average surface roughness (Ra) of 0.3 to 2.0 nm on the surface of the silicon substrate.

2. The method for manufacturing a surface-treated silicon substrate according to claim 1, wherein said step of forming a texture results in 20 to 300 lines per 1 μm in a radial direction, 40 to 500 protrusions per 1 μm$^2$, and the average surface roughness (Ra) of 0.3 to 2.0 nm on the surface of the silicon substrate.

3. The method for manufacturing a surface-treated silicon substrate according to claim 1, wherein said step of forming a texture results in the average roughness in a radial direction being 0.3 to 2.0 nm, and the average roughness in a circumferential direction being 0.1 to 2.0 nm on the surface of the silicon substrate.

4. The method for manufacturing a surface-treated silicon substrate according to claim 1, wherein said abrasive is a particle selected from a group consisting of diamond, aluminum, titanium oxide, silicon carbide and titanium carbide, and its average particle size is 300 nm or less.

5. The method for manufacturing a surface-treated silicon substrate according to claim 1, wherein said step of removing or reducing an oxide film comprises polishing.

6. The method for manufacturing a surface-treated silicon substrate according to claim 1, wherein said step of removing or reducing an oxide film comprises use of a chemical liquid.

7. The method for manufacturing a surface-treated silicon substrate according to claim 6, wherein said chemical liquid is a fluorine-containing compound.

TABLE 2

| | thickness of oxide on surface (nm) | texturing conditions slurry | spindle reciprocation (Hz) | Roughness (nm) line analysis in circumfential direction | line analysis in radial direction | total line analysis | lines in radial direction (lines/μm) | magnetic anisotropy | attachment of head in CSS test |
|---|---|---|---|---|---|---|---|---|---|
| Example 9 | 1.0 | diamond | 0 | 0.55 | 0.65 | 0.72 | 17 | present | none |
| Example 10 | 0.5 | diamond | 0 | 0.63 | 0.74 | 0.82 | 18 | present | none |
| Example 11 | 0.5 | diamond | 1 | 0.65 | 0.85 | 0.88 | 19 | present | none |
| Example 12 | 0.5 | diamond | 2 | 0.68 | 0.90 | 0.95 | 20 | present | none |
| Example 13 | 0.5 | diamond | 5 | 0.75 | 0.90 | 1.05 | 21 | present | none |
| Example 14 | 0.5 | diamond | 10 | 0.77 | 0.95 | 1.15 | 23 | present | none |
| Example 15 | 1.5 | diamond | 0 | 0.45 | 0.55 | 0.64 | 15 | present | none |
| Example 16 | 0.5 | diamond | 0 | 0.65 | 0.75 | 0.85 | 18 | present | none |
| Example 17 | 0.5 | diamond | 0 | 0.64 | 0.74 | 0.83 | 17 | present | none |
| Comp. Ex. 3 | 2.5 | — | — | 0.11 | 0.10 | 0.13 | none | none | present |
| Comp. Ex. 4 | 2.5 | diamond | 0 | 0.20 | 0.33 | 0.35 | 9 | present | present |

The invention claimed is:

1. A method for manufacturing a surface-treated silicon substrate for a magnetic disk comprising the steps of:
   reducing a silicon oxide film existing on a surface of a silicon substrate; and
   forming a texture on the surface of the silicon substrate having the oxide film reduced using a free abrasive-containing slurry and a tape,
   wherein said step of reducing a silicon oxide film results in the oxide film having thickness of 0.5 to 2 nm, and wherein said step of forming a texture results in 10 to 8. The method of manufacturing a surface-treated silicon substrate according to claim 1, wherein said step of forming a texture on the silicon substrate is performed by reciprocating the tape, while dropping the slurry between the tape and substrate under conditions with a spindle speed of 100 to 1000 rpm, a roll pressure of 100 g to 10 kg, a texturing time of 5 to 60 seconds and a reciprocation frequency of 1 to 50 Hz.

9. The method for manufacturing a surface-treated substrate according to claim 1, wherein the magnetic disk is a hard disk.

* * * * *